(12) United States Patent
Butera

(10) Patent No.: US 12,119,026 B2
(45) Date of Patent: Oct. 15, 2024

(54) MULTIMEDIA MUSIC CREATION USING VISUAL INPUT

(71) Applicant: Artiphon, Inc., Nashville, TN (US)

(72) Inventor: Michael V. Butera, Nashville, TN (US)

(73) Assignee: Artiphon, Inc., Nashville, TN (US)

( * ) Notice: Subject to any disclaimer, the term of this patent is extended or adjusted under 35 U.S.C. 154(b) by 0 days.

(21) Appl. No.: 17/722,202

(22) Filed: Apr. 15, 2022

(65) Prior Publication Data

US 2022/0335974 A1    Oct. 20, 2022

Related U.S. Application Data

(60) Provisional application No. 63/175,156, filed on Apr. 15, 2021.

(51) Int. Cl.
*G11B 27/031* (2006.01)
*G06V 20/40* (2022.01)

(52) U.S. Cl.
CPC ............ *G11B 27/031* (2013.01); *G06V 20/41* (2022.01)

(58) Field of Classification Search
None
See application file for complete search history.

(56) References Cited

U.S. PATENT DOCUMENTS

| | | | |
|---|---|---|---|
| 10,692,480 B2* | 6/2020 | Yao | G06F 16/635 |
| 11,011,144 B2* | 5/2021 | Silverstein | G06N 20/00 |
| 11,030,479 B2* | 6/2021 | Krishnamurthy | G06N 3/08 |
| 11,450,353 B2* | 9/2022 | Krishnamurthy | G06V 20/40 |
| 2017/0091983 A1 | 3/2017 | Sebastian et al. | |
| 2018/0226063 A1* | 8/2018 | Wood | G11B 27/031 |
| 2020/0073885 A1* | 3/2020 | Baijal | G06F 16/7844 |
| 2020/0278993 A1 | 9/2020 | Marino et al. | |
| 2020/0349387 A1* | 11/2020 | Krishnamurthy | G06N 3/044 |
| 2021/0195281 A1* | 6/2021 | Zhao | H04N 21/8106 |
| 2021/0287643 A1* | 9/2021 | Qiu | G06T 11/001 |
| 2022/0321944 A1* | 10/2022 | Hosseini | H04N 21/2335 |

* cited by examiner

*Primary Examiner* — Gelek W Topgyal
(74) *Attorney, Agent, or Firm* — Blank Rome LLP

(57) ABSTRACT

A system for creating music using visual input. The system detects events and metrics (e.g., objects, gestures, etc.) in user input (e.g., video, audio, music data, touch, motion, etc.) and generates music and visual effects that are synchronized with the detected events and correspond to the detected metrics. To generate the music, the system selects parts from a library of stored music data and assigns each part to the detected events and metrics (e.g., using heuristics to match musical attributes to visual attributes in the user input). To generate the visual effects, the system applies rules (e.g., that map musical attributes to visual attributes) to translate the generated music data to visual effects. Because the visual effects are generated using music data that is generated using the detected events/metrics, both the generated music and the visual effects are synchronized with—and correspond to—the user input.

20 Claims, 12 Drawing Sheets

MULTIMEDIA MUSIC CREATION USING VISUAL INPUT

CROSS-REFERENCE TO RELATED APPLICATIONS

This application claims priority to U.S. Prov. Pat. Appl. No. 63/175,156, filed Apr. 15, 2021, which is hereby incorporated by reference in its entirety.

BACKGROUND

Historically, mastering a musical instrument has required musicians to learn advanced music theory and to develop intricate muscle-memory for a specific instrument. Similarly, to fully take advantage of recording equipment built for professionals has required years of experience. Additionally, in the age of social media, musicians have a desire to share music in the form of video. Meanwhile, generating visual content that is synchronized with the music requires content creators to master an entirely separate set of professional tools.

As technology has advanced, solutions have emerged that lower the barrier to entry to produce art. In photography and graphic design, for example, advances in smartphone hardware and machine learning algorithms allow anyone with an Instagram account to enhance photographs with visual filters that mirror techniques developed by the most skilled photographers and graphic designers.

In the field of multimedia content creation, there is a need for a system that uses consumer hardware and server-side technology to automate the most difficult aspects of music creation and video production. Specifically, there is a need for a system that applies the principles of music theory to allow users to express themselves musically regardless of their level of technical skill and experience. Preferably, the system also allows users to capture video content and enhance that video with special effects that are automatically synthesized and synchronized with the music.

SUMMARY

In view of those and other drawbacks of the prior art, a system for creating music using visual input is provided. The system receives user input data (e.g., video, gestures, touch, audio, music data, motion, etc.) that includes visual input (e.g., an image or images), detects events and metrics in the user input data (e.g., by detecting objects or gestures in video), and generates music and visual effects that are synchronized with the detected events and correspond to the detected metrics. Accordingly, the disclosed system allows users to capture everyday moments and enhances those moments with music, providing users of every level of technical skill with the ability to soundtrack their lives and express themselves socially in new ways.

To generate music that is synchronized with and corresponds to the user input, the system includes a library of stored music data, selects parts of the stored music data (e.g., based on visual characteristics of the user input data and/or user preferences), generates music data by assigning each selected part to the events and metrics detected in the user input data, and translates those events and metrics to music by synthesizing the generated music data. To generate the visual effects, the system applies rules (e.g., mapping musical attributes to visual attributes) to translate the generated music data to visual effects. Because the visual effects are generated using music data that is generated using the detected events/metrics, both the generated music and the visual effects are synchronized with—and correspond to— the user input.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

FIGS. 6A and 6B are views of the virtual object user interface according to other exemplary embodiments;

DETAILED DESCRIPTION

Figure 1:
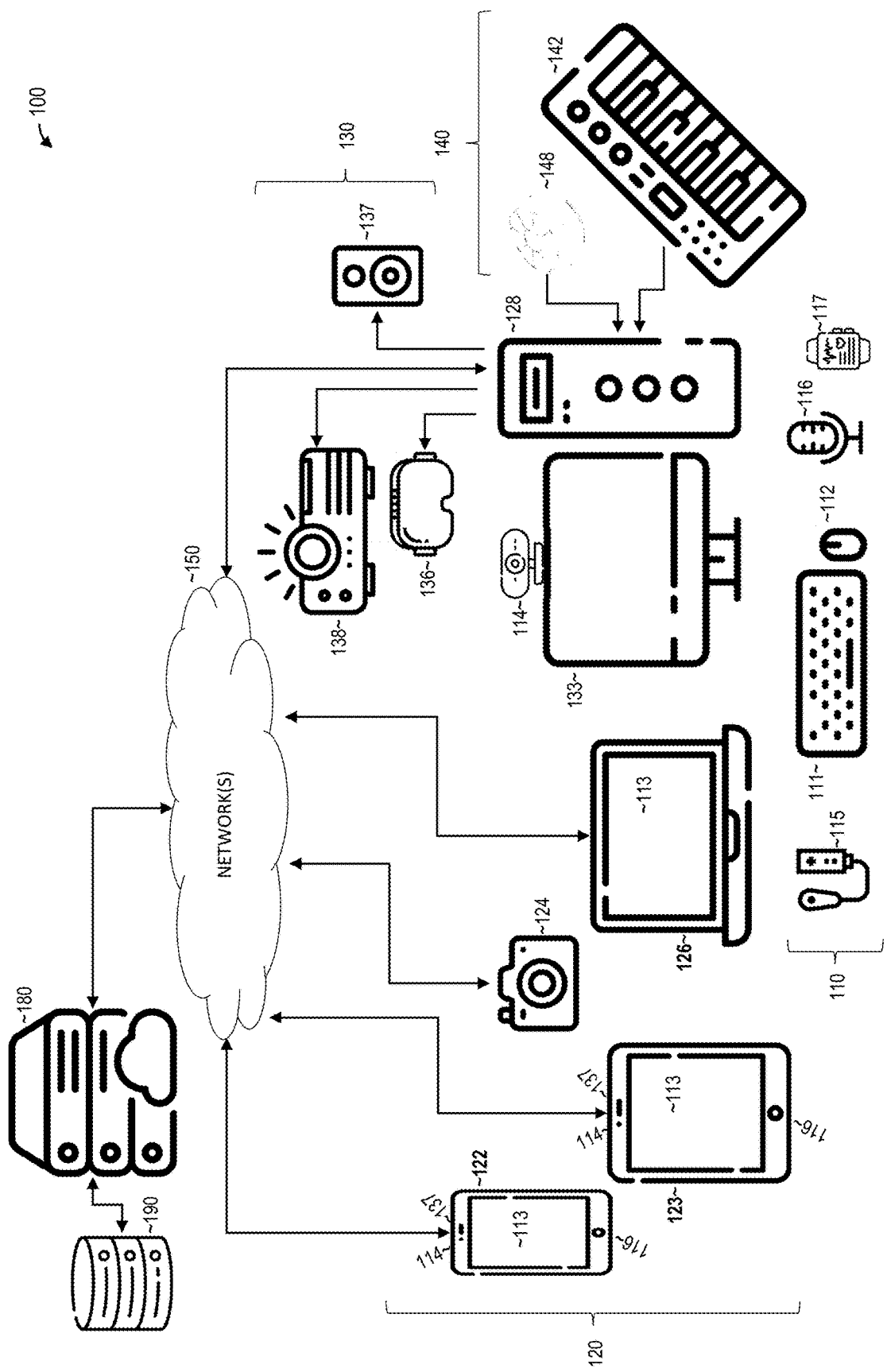
FIG. 1 is a schematic diagram of an architecture of a multimedia content generation system according to exemplary embodiments.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 of a multimedia content generation system according to exemplary embodiments of the invention. As shown in FIG. 1, the architecture 100 includes user devices 120 in communication with one or more servers 180 via one or more networks 150. In some embodiments, the architecture 100 may include peripheral musical instruments 140.

In many instances, the user devices 120 include smartphones 122 and tablet computers 123. However, the disclosed system is not so limited. Instead, the user devices 120 may include any suitable computing device that executes instructions to perform the functions described herein, including digital cameras 124, video game consoles, notebook computers 126, desktop computers 128, etc. Each user device 120 includes non-transitory computer readable storage media (e.g., a hard drive, flash memory, dynamic random access memory, etc.) and at least one hardware computer processor (e.g., a central processing unit, a graphics processing unit, etc.).

The user devices 120 may include input devices 110, such as keyboards 111, mouses 112, touchpads, cameras 114, external controllers 115 (e.g., videogame controllers), microphones 116, fitness trackers 117, etc. The cameras 114 may include two-dimensional cameras 114, three-dimensional scanners (e.g., Lidar), etc. Additionally or alternatively, the user devices 120 may include output devices 130, such as two-dimensional displays 133, three-dimensional displays 136 (e.g., augmented reality glasses, virtual reality goggles, etc.), speakers 137, (two-dimensional and/or holographic) projectors 138, etc. The input devices 110 and/or the output devices 130 may include peripheral devices (e.g., in wireless or wired communication with a desktop computer 128) and devices that are integrated into user devices 120. For instance, the keyboards 111 may integrated into notebook computers 126 and other user devices 120. Similarly, the cameras 114, microphones 116, and speakers 137 may be integrated into smartphones 122, tablet computers 124, notebook computers 126, and other user devices 120. The touchpads and display devices 133 may integrated into user devices 120, for example as touchscreen displays 113. Some user devices 120 (e.g., smartphones 122, tablet computers 123, etc.) and/or input devices 110 (e.g., external controllers 115, fitness trackers 117) may include an inertial measurement unit (IMU) that measures the force and angular rate (and, in some instances, orientation) of the user device 120 or input device 110.

Peripheral musical instruments 140 may include acoustic musical instruments and digital musical instruments such as a musical instrument digital interface (MIDI) keyboard 142, an ORBA 148, etc. (ORBA is a registered trademark of Artiphon, Inc.) In some embodiments, the architecture 100 may include other gathering devices of the user, such weather detectors, motion sensors, etc.

The network(s) 150 may include any combination of wireless and/or wired networks. The network(s) 150 may include, for example, a wide area network (e.g., the Internet), a cellular network, a local area network, etc.

The server(s) 180 may include any suitable computing device that execute instructions to perform the functions described herein. The server(s) include non-transitory computer readable storage media 190 and one or more hardware computer processors. The server(s) 180 may include, for example, a web server that provides a user interface that is accessible by user devices 120 using a web browser. Additionally or alternatively, the server(s) 180 may include an application server (e.g., a mobile application server) that makes software executed by the server(s) 180 accessible to a software program executed by the user devices 120 (e.g., a mobile application running on the smartphones 122, tablets 123, and other user devices 120).

The computer readable storage media 190 may include any hardware storage medium, such as a hard disk, solid-state memory, etc. The computer readable storage media 190 may be internal to the server(s) 180. Alternatively, the server(s) 180 may communicate with the computer readable storage media 190 via a wired connection, a wireless connection, a local area network, etc.

Figure 2:
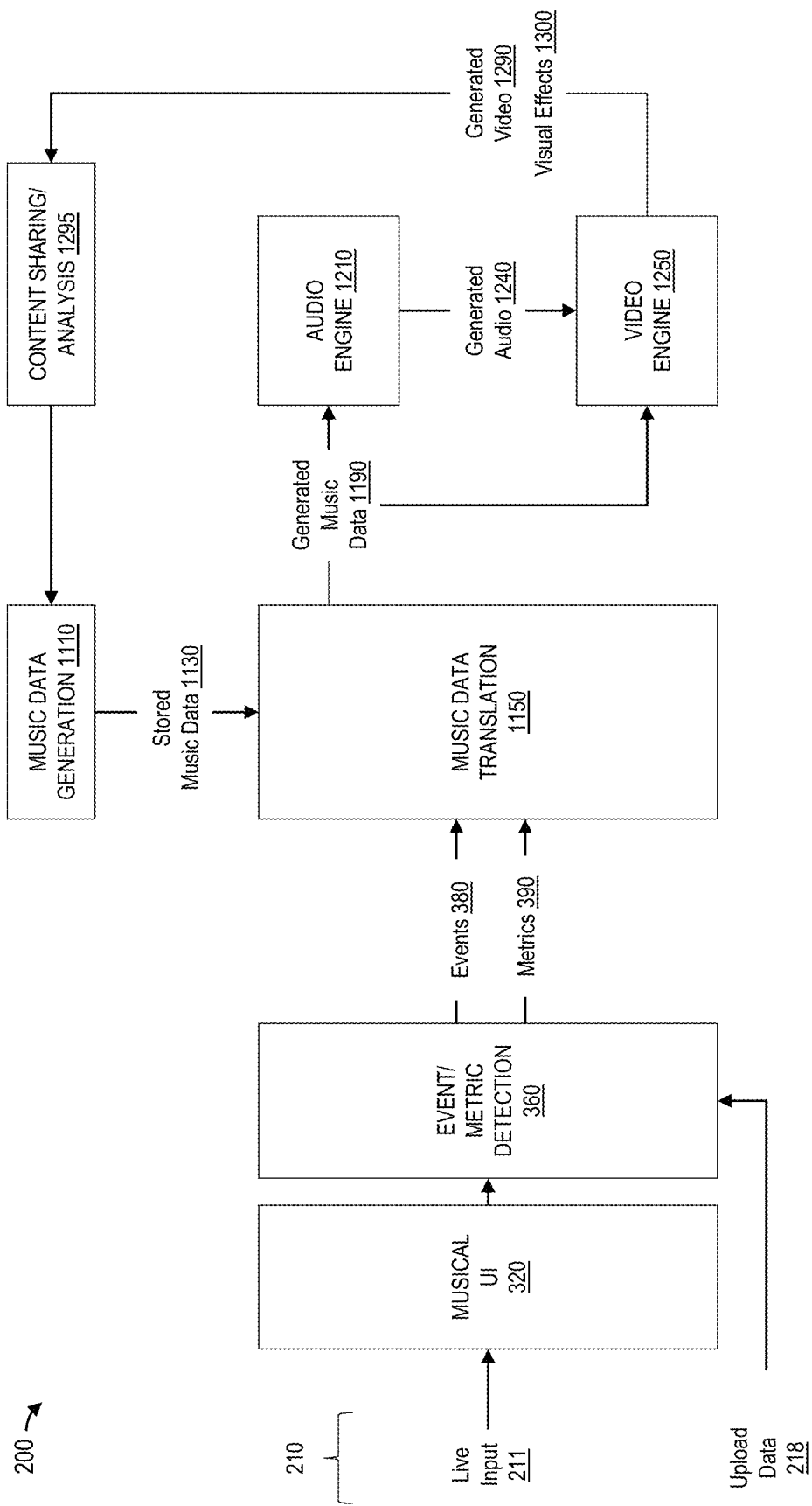
FIG. 2 is a block diagram the multimedia content generation system according to an exemplary embodiment.

FIG. 2 is a block diagram of the multimedia content generation system 200 according to an exemplary embodiment.

In the embodiment of FIG. 2, the multimedia content generation system 200 includes a musical user interface (UI) 320, an event/metric detection unit 360, a music data generation unit 1110, a music data translation unit 1150, an audio engine 1210, a video engine 1250, and a content sharing and analysis unit 1295. The music data generation unit 1110 and the content sharing and analysis unit 1295 may be realized as software executed, for example, by the server(s) 180. The event/metric detection unit 360, the music data generation unit 1110, the music data translation unit 1150, the audio engine 1210, and the video engine 1250 may be realized as software executed by the server(s) 180 and/or executed by the user devices 120.

As described in detail below with reference to FIG. 3, the multimedia content generation system 200 provides functionality for users to provide user input data 210, which may include live input data 211 (provided, for example, via the musical UI 320) and/or upload data 218. The event/metric detection unit 360 identifies events 380 and metrics 390 in the user input data 210, which are used by the multimedia content generation system 200 to generate multimedia content derived from the user input data 210. Example embodiments of the musical UI 320 are described below with reference to FIGS. 4 through 12.

As described in detail below with reference to FIG. 11, the music data generation unit 1110 uses machine learning to generate a library of stored music data 1130, enabling the music data translation unit 1350 to translate the events 380 and metrics 390 identified by the event/metric detection unit to generated music data 1190 by selecting parts from the stored music data 1130 (e.g., notes, musical phrases, instruments, musical effects, etc.) and assign those parts to the detected events 380 and metrics 390.

As described in detail below with reference to FIGS. 12 and 13, the audio engine 1210 generates audio (generated audio 1240) using the generated music data 1190 and the input data 210 provided by the user. The video engine 1250 uses the generated music data 1190 to generate visual effects 1300 and generates video (generated video 1290) that includes the generated audio 1240 and those visual effects 1300. Because those visual effects are generated using generated music data 1190 derived from the events 380 and metrics 390 in the user input data 210, those visual effects 1300 are synchronized with the events 380 and correspond to the metrics 390 used to generate the generated audio 1240.

The content sharing and analysis unit 1295 provides functionality for users to output and share generated video 1290 (e.g., via social media). The content generated and shared by users is then added to a dataset used by the music data generation unit 1110 to generate stored music data 1130 for future users of the system 200.

Figure 3:
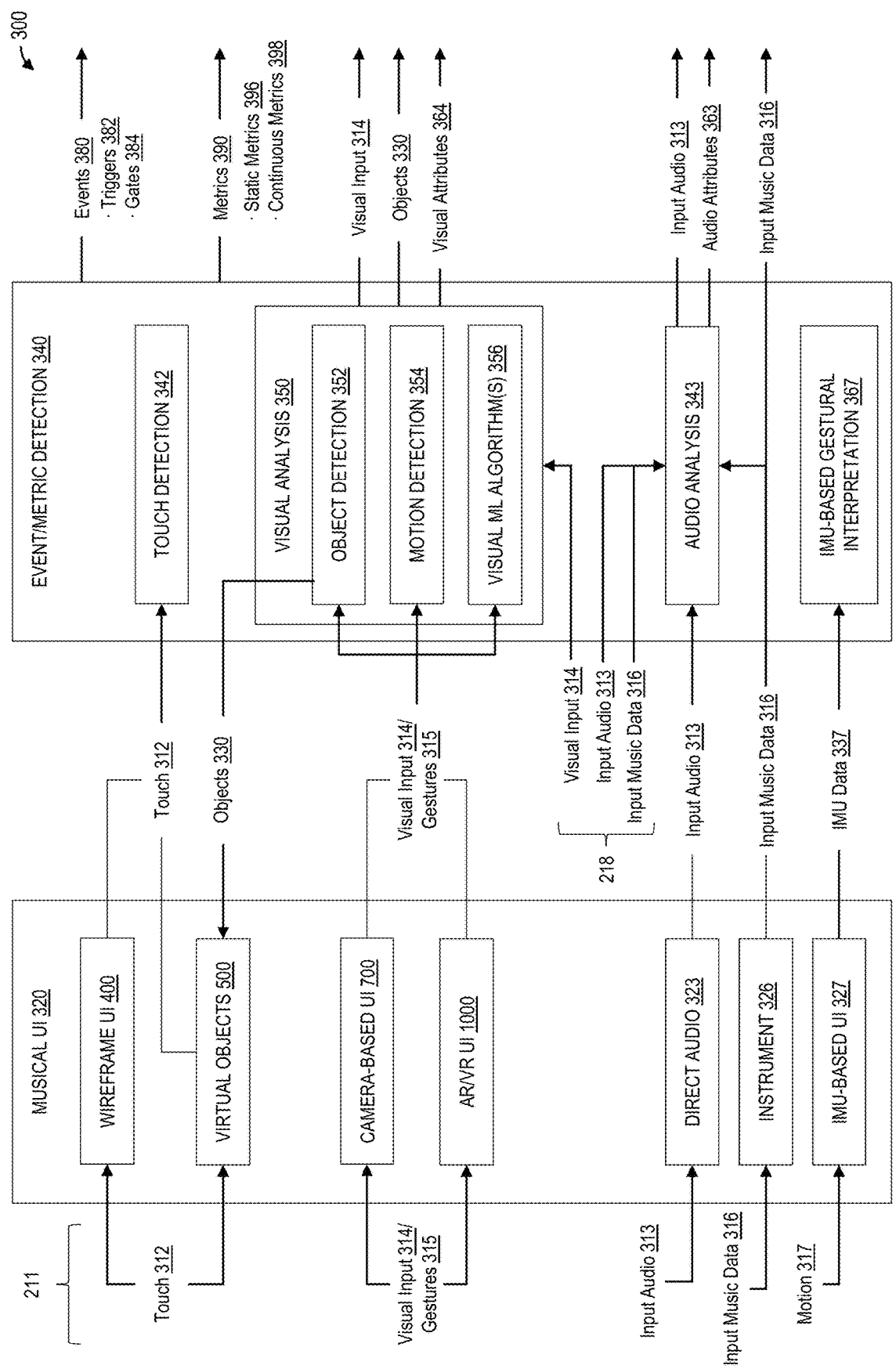
FIG. 3 is a block diagram of a musical user interface and event/metric detection unit according to an exemplary embodiment.

FIG. 3 is a block diagram of the musical UI 320 and the event/metric detection unit 340 according to an exemplary embodiment.

As briefly mentioned above, the user input data 210 may include live input data 211 provided by users via the musical UI 320 and/or upload data 218. As shown in FIG. 3, the live input data 211 may include touch input 312 (input, for example, via a touchscreen 113), visual input 314 and/or gestures 315 (captured, for example, via a camera 114), input audio 313 (captured, for example, via a microphone 116), input music data 316 (provided, for example, via a peripheral musical instrument 140), motion 317 (captured, for example, via an IMU of a user device 120 or an input device 110), etc.

The upload data 218 may include content files, such as pre-recorded input audio 313, pre-captured visual input 314, input music data 316 (e.g., a MIDI file), etc. The upload data 218 may also include external data, such as meteorological data (received, for example, from a weather sensor or from a weather data source via the one or more networks 150). The upload data 218 may be provided, by the user, to a user device 130 or may be uploaded to the server 180, via the one or more networks 150, from another source.

The visual input 314 may include one or more images. Those one or more images may be captured (e.g., by a camera) or generated (e.g., by a computer). For example, the visual input 314 may include a video or photograph (taken by the camera 114 or uploaded as part of the upload data 218), a computer-generated image or images (e.g., an animation, a video game live stream, etc.), a computer-generated visualization, etc.

As shown in FIG. 3, the musical UI 320 may include a wireframe UI 400 (described below with reference to FIGS. 4A-4B), a virtual objects UI 500 (described below with reference to FIGS. 5A-5B and 6A-6B), a camera-based UI 700 (described below with reference to FIGS. 7 through 9), an augmented reality (AR) or virtual reality (VR) UI 1000 (described below with reference to FIG. 10), a brain-computer interface, direct audio 323 (e.g., capturing input audio 313 using a microphone 116), an instrument UI 326 (for capturing input music data 316 output by a peripheral musical instrument 140), an IMU-based UI 327, etc.

As briefly mentioned above, the event/metric detection unit 340 detects events 380 and metrics 390 in the user input data 210. As used herein, events 380 are binary occurrences (such as tap on a touchscreen 113) whereas metrics 390 are values that have a specific magnitude (such as a setting on a knob). The events 380 may include triggers 382, which are nearly instantaneous occurrences (such as the pluck of a guitar string), and gates 384, which have a defined period of duration (such as the pressing of a key on a piano). Meanwhile, the metrics 390 may include static metrics 396, which have a fixed magnitude (e.g., activation velocity, deactivation velocity, etc.), and continuous metrics 398, which have magnitudes that may change over time (e.g., velocity of movement, acceleration of movement, direction of movement, pressure applied via a touchscreen 113, area of activation of a touchscreen 113, etc.).

In the embodiment of FIG. 3, the event/metric detection unit 340 includes a touch detection module 342, a visual analysis unit 350, an audio analysis module 343, and an IMU-based gestural interpretation module 367. The touch detection module 342 identifies events 380 and metrics 390 by identifying each touch 312 (input, for example, via a touchscreen 113), including the timing of each touch 312, the location of each touch 312, the movement, direction, and pressure of each touch 312, etc.

The visual analysis unit 350 analyzes visual input 314 (e.g., captured by a camera 114 or uploaded as part of the upload data 218) and recognizes objects 330 and gestures 315 (e.g., performed by the user or other objects in the visual input 314). To do so, the visual analysis unit 350 may include an object detection module 352 and a motion detection module 354. The object detection module 352 may employ any of the known methods for detecting instances of semantic objects 330 in the visual input 314 (and, in some embodiments, classifying those objects 330). For instance, the object detection module 352 may employ a neural network approach (e.g., based on convolutional neural networks) such as region proposals, a Single Shot MultiBox Detector (SSD), You Only Lok Once (YOLO), Single-Shot Refinement Neural Network for Object Detection (RefineDet), Retina-Net, deformable convolutional networks, etc., or a non-neural approach such as the Viola-Jones object detection framework, scale-invariant feature transform (SIFT), a histogram of oriented gradients (HOG) features, etc. The motion detection module 354 may employ any of the known methods for analyzing sequential frames of the visual input 314 and outputting information indicative of the movement of targets between those frames. For instance, the motion detection module 354 may perform target representation and localization (e.g., using kernel-based tracking, contour tracking, etc.) and filtering and data association (e.g., using a Kalman filter, a particle filter, etc.). Accordingly, the object detection module 352 may detect points, edges, areas, or other geometric dimensions. For example, when a camera 114 is pointed at a house, the object detection module 352 may detect that there is a single object, that there are many horizontal and vertical lines, or that there are multiple plane areas with three-dimensional relationships. The object detection module 352 and the motion detection module 354 may also identify specific categories of objects 330 (for example, discerning between architecture and human bodies) and differentiate between multiple objects 330 in the visual field (for example, identifying and tracking two separate bodies dancing next to each other).

The visual analysis unit 350 identifies events 380 that occur in the visual input 314 (such as a person starting to run) and metrics 390 derived from that visual input 314 (such as the speed at which the person runs across the frame).

The visual analysis unit 350 also uses visual machine learning algorithms 356 (e.g., one or more neural networks, k-means clustering, a support vector machine, etc.) to determine visual attributes 364 of the visual input 314—such as the color palette, saturation, brightness, contrast, dynamic range, sharpness, complexity, etc.—and identified objects 330 in the visual input 314—such as the size of the object 330, the color profile of the object 330, the motion of the object 330, changes in size or shape of the object 330, limbs or other defining features of the object 330, etc.

The audio analysis module 343 identifies events 380 and metrics 390 in the input audio 314 (e.g., captured by a microphone 116 or uploaded as part of the upload data 218) and/or input music data 316 (e.g., played using a peripheral musical instrument 140 or uploaded as part of the upload data 218). For example, the audio analysis module 343 may identify audio-relevant metrics 390 (e.g., pitch) and use software gate thresholds to identify events 390 (e.g., when those audio-relevant metrics 390 satisfy various gate thresholds). The audio analysis module 343 also analyzes that input audio 314 and/or input music data 316 to identify audio attributes 364 (e.g., the key, tempo, harmony, melody, rhythm, texture, timbre, dynamics, form, tonality, etc.) of the input audio 314 or input music data 316. For example, the audio analysis module 343 may perform beat detection, polyphonic note detection, etc. In some embodiments, the audio analysis module 343 may perform audio source separation (e.g., using machine learning) to isolate and separate parts of a song (e.g., separating instruments, separating harmony and melody, etc.).

The IMU-based gestural interpretation module 367 identifies events 380 and metrics 390 in motion 317 input by the user by analyzing IMU data 337 output by the IMU of a user device 120 or an input device 110 and received via the IMU-based UI 327.

Figure 4B:
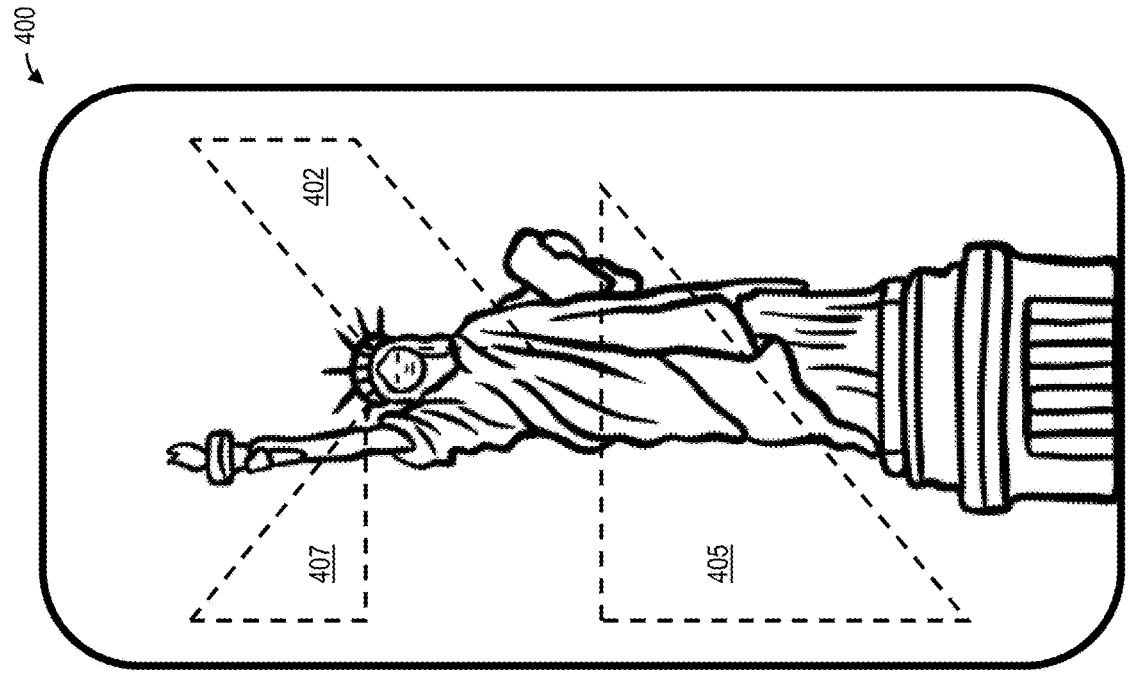
FIGS. 4A and 4B are views of a wireframe user interface according to exemplary embodiments.
Figure 4A:
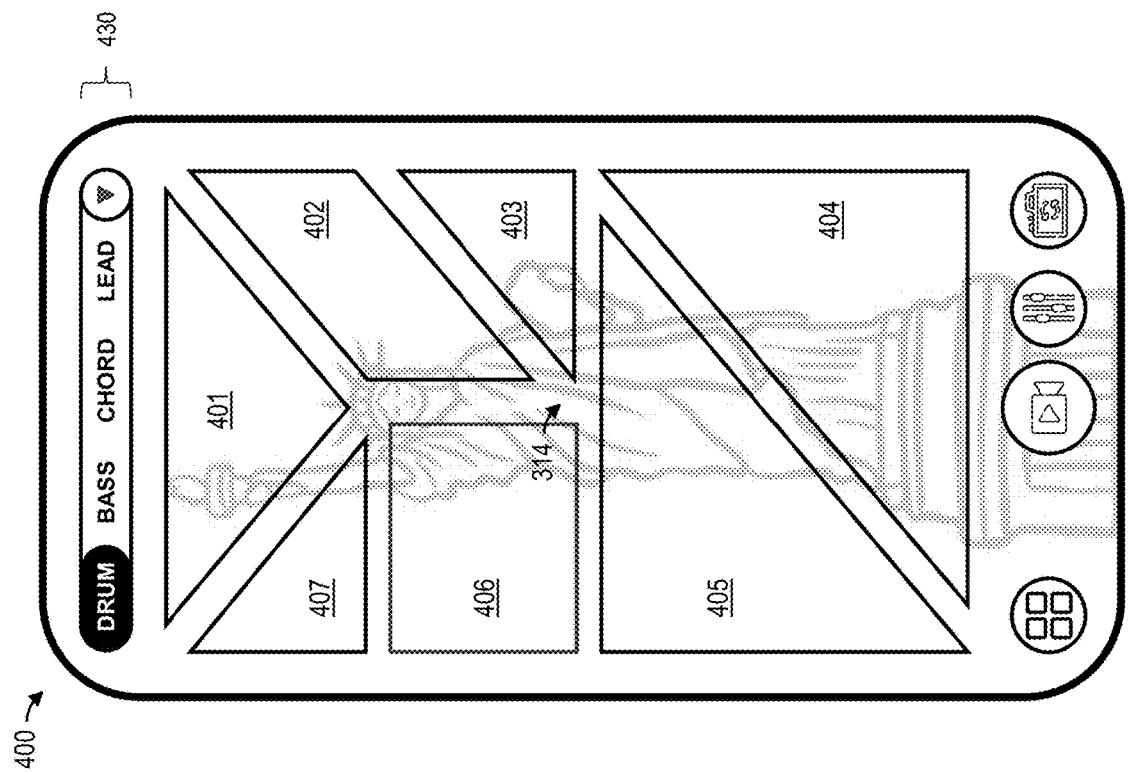

FIGS. 4A and 4B are views of the wireframe UI 400 according to exemplary embodiments. The wireframe UI 400 provides functionality for users to capture visual input 314 while designating certain regions of the touchscreen display 113 as user-selectable interface elements (e.g., buttons to input events 380, sliders or dials to input or change metrics 390, etc.). In some embodiments, the wireframe UI 400 may display visible interface elements (for example, regions 401 through 407 of FIG. 4A). In other embodiments, the regions of the touchscreen display 113 that act as user-selectable interface elements may not be visible. In FIG. 4B, for example, the dashed lines indicate the regions 402, 405, and 407, which may be selectable and manipulable by the user but may not be visible via the wireframe UI 400.

The musical UI 320 also provides functionality for the user to input user preferences 430, for example to select a music genre, a mood, an instrument, etc. Based on that user preference, the system 200 may assign each interface element to provide functionality for the user to play a specific part of a composition (e.g., a specific note, a specific musical phrase, a specific instrument in an ensemble, etc.) or to apply a specific musical effect (e.g., tuning the audio to specific notes or microtonal pitches, applying novel modulations or response curves, etc.).

Figure 5B:
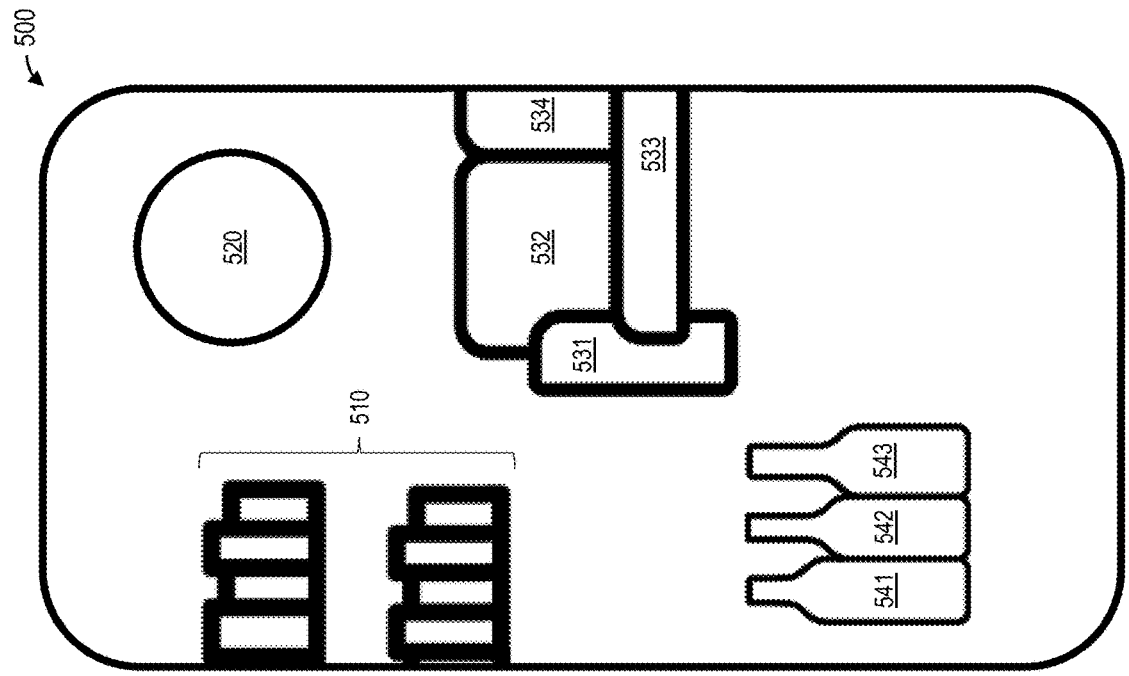
FIG. 5B is another view of the virtual object user interface of FIG. 5A according to an exemplary embodiment.
Figure 5A:
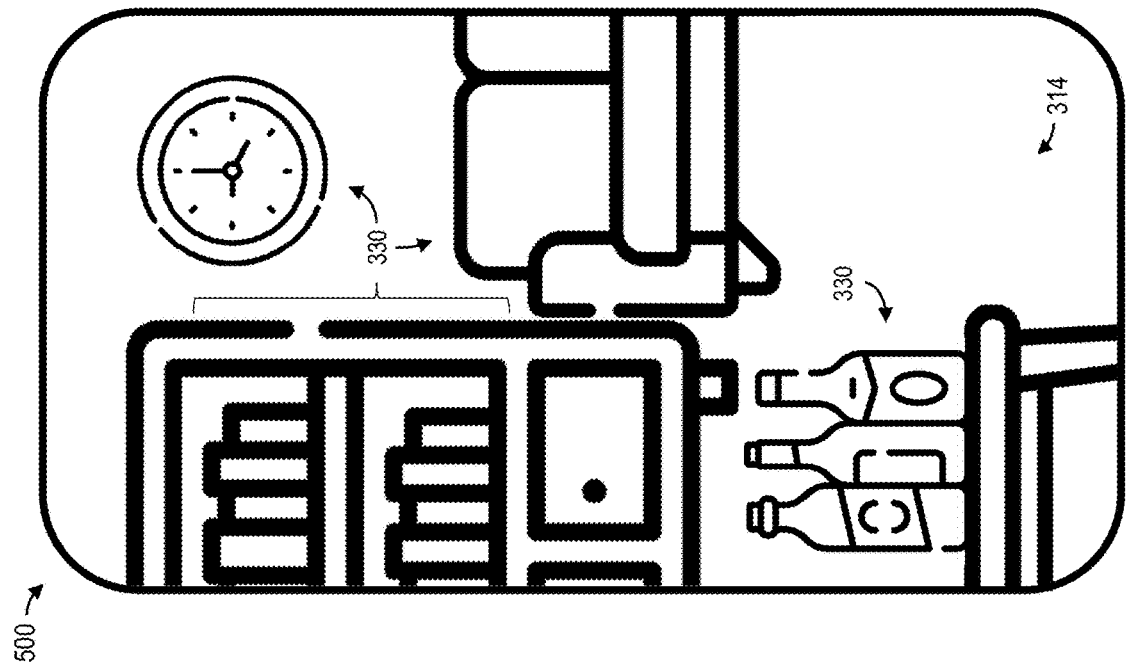
FIG. 5A is a view of a virtual object user interface according to an exemplary embodiment.

FIGS. 5A and 5B are views of the virtual object UI 500 according to exemplary embodiments. As described above, the visual analysis unit 350 analyzes visual input 314 and recognizes objects 330. In the example of FIGS. 5A and 5B, for instance, the visual analysis unit 350 identifies books 510, a clock 520, portions 531-534 of a couch, and bottles 541-543. Using the virtual object UI 500, each of those virtual objects 330 may be designated as user-selectable interface elements (e.g., buttons to input events 380, sliders or dials to input or change metrics 390, etc.). Again, the system 200 may assign each interface element to provide functionality for the user to play a specific part of a composition or apply a specific musical effect, which may be selected based on user preference 430. Additionally, as described below, the system 200 may assign parts to each object 330 based on the visual attributes 364 of that object 330. For instance, based on the repeated rectangular pattern of the books 510, the system 200 may designate those books 510 to provide functionality to play the keys of a virtual keyboard. Additionally, because of their hollow, translucent appearance, the system 200 may designate the bottles 541-543 as chimes, a woodwind instrument, horns, etc. The couch cushions 531 through 534 may be assigned to various drums of a drum kit with the clock 520 being assigned as a cymbal (e.g., because of its circular shape).

Figure 6B:
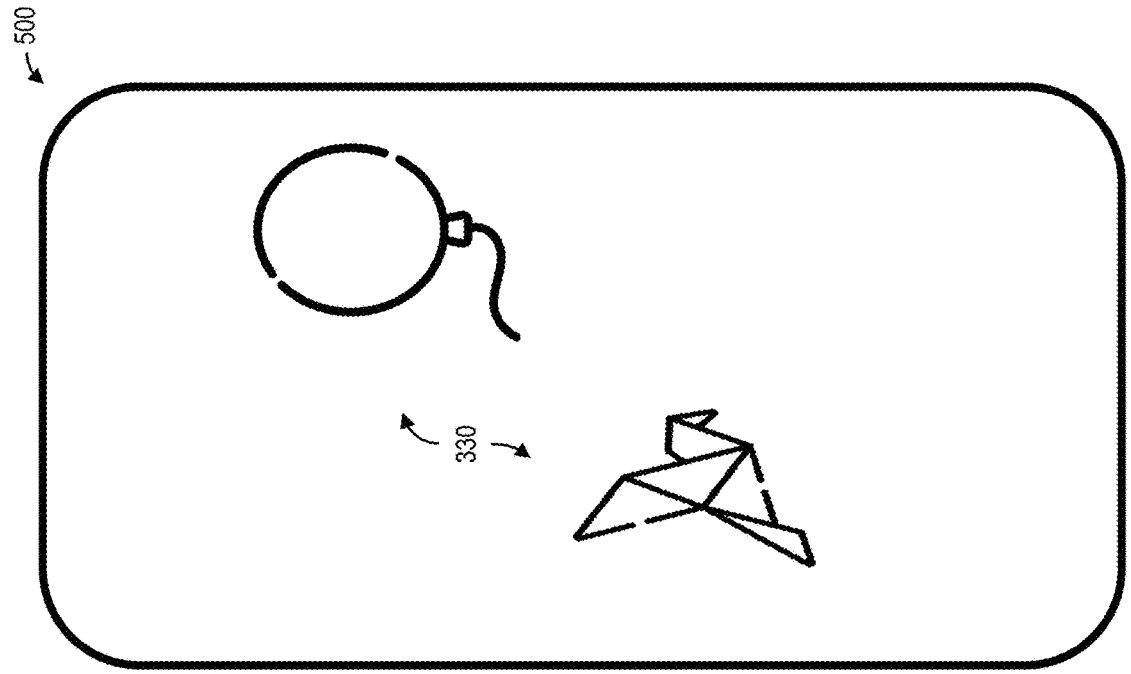
FIG. 6B is another view of the virtual object user interface of FIG. 6A according to an exemplary embodiment.
Figure 6A:
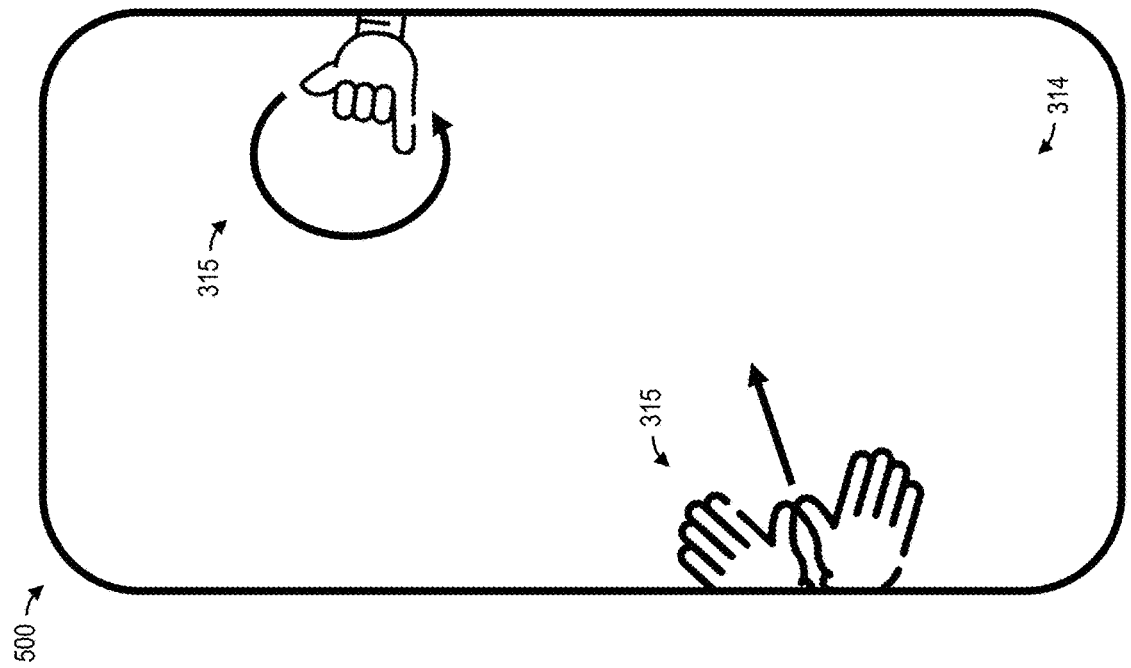
FIG. 6A is a view of a virtual object user interface according to another exemplary embodiments.

FIGS. 6A and 6B are views of the virtual object UI 500 according to other exemplary embodiments. As described above, the visual analysis unit 350 analyzes the visual input 314 and recognizes gestures 315. Accordingly, in some embodiments, the virtual object UI 500 may recognize gestures 315, generate virtual objects 330 that correspond to those gestures 315, display those virtual objects 330 on the touchscreen 113, and assign each virtual object 330 to provide functionality for the user to apply a specific musical effect or play a specific part of a composition (selected, for example, based on user preferences 430 and/or the visual attributes 364 of the object 330). In the example of FIGS. 6A and 6B, for instance, the visual analysis unit 350 recognizes gestures 315 and generates virtual objects 330 that include a balloon and a bird.

Figure 8:
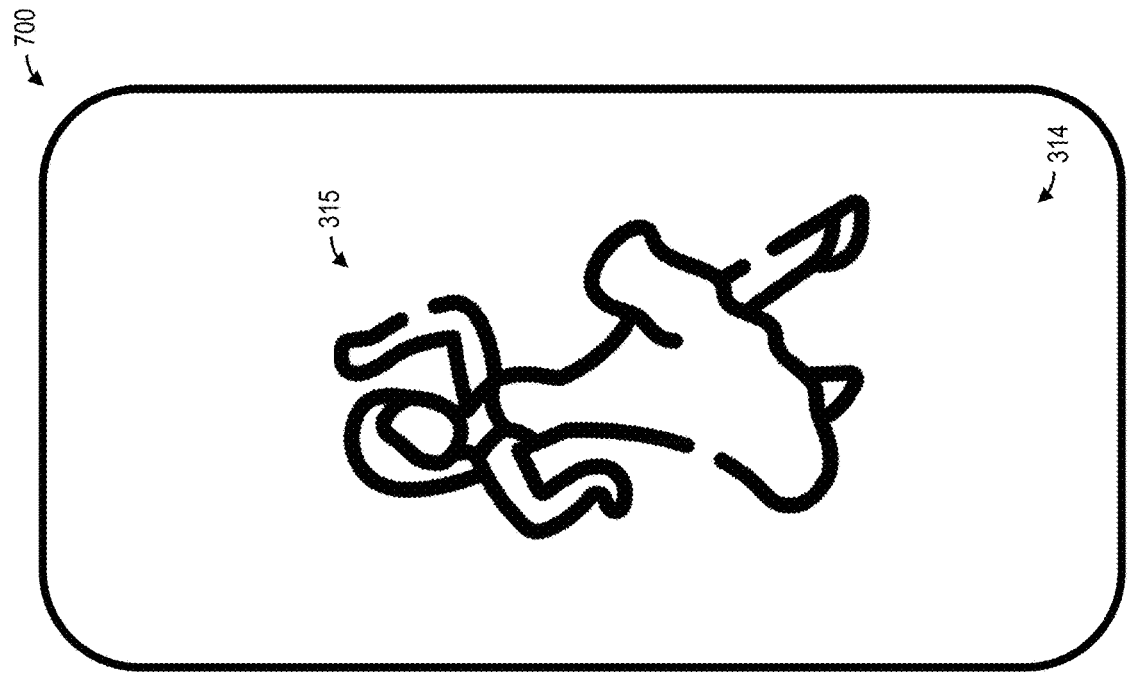
FIG. 8 is a view of a camera-based user interface according to another exemplary embodiment.
Figure 7:
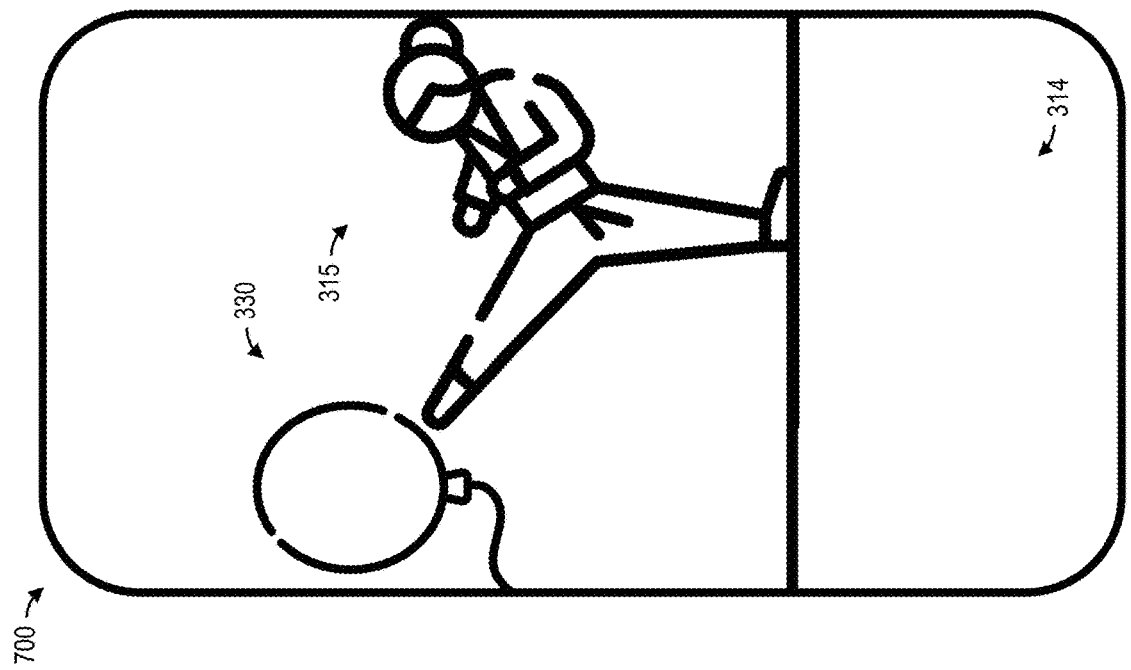
FIG. 7 is a view of a camera-based user interface according to an exemplary embodiment.
Figure 9:
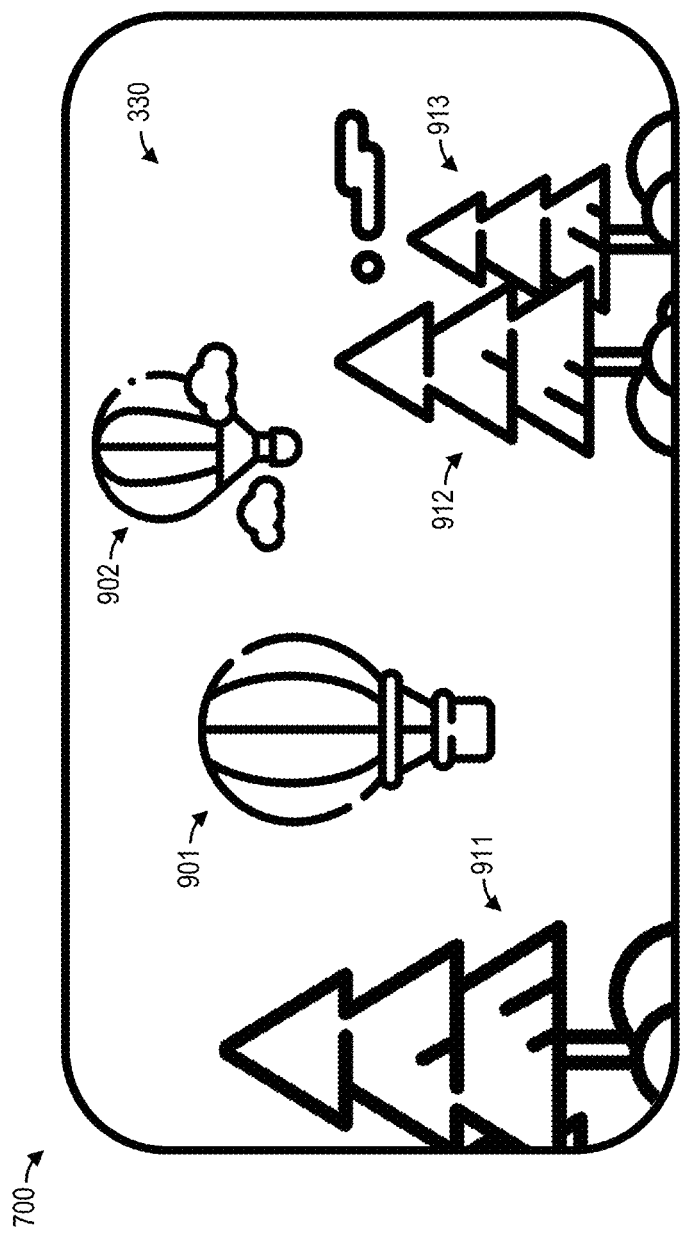
FIG. 9 is a view of a camera-based user interface according to another exemplary embodiment.

FIGS. 7 through 9 are views of the camera-based UI 700 according to exemplary embodiments. As shown in FIG. 7, by recognizing gestures 315, the camera-based UI 700 enables users to interact with virtual objects 330. As shown in FIG. 8, the visual analysis unit 350 also recognizes gestures 315 and other movement in the visual input 314 as users interact in the real world. In the example of FIG. 8, the system 200 may recognize events 380 while a user is dancing (these events can occur at a tempo dictated by the tempo of the dancing by the user) and metrics 390 derived from those gestures 315 (e.g., the movement and velocity of those gestures 315). In another example, gestures 315 may include users playing imaginary musical instruments (e.g., air guitar, using a table as an imaginary keyboard, etc.). In those instances, the system 200 may recognize events 380 that occur as the user mimics the playing of each note and metrics 390 that include the placement of the user's hands and fingers (indicating the notes the user is mimicking playing.) In each instance, the event/metric detection unit 340 analyzes the visual input 314 and identifies events 380 and metrics 390, which are translated into music content that is synthesized as synchronized with the visual input 314 as described below. As shown in FIG. 9 and described in greater detail with reference to FIG. 13, the visual analysis unit 350 recognizes non-human objects 330 (in this example, hot air balloons 901 and 902 and trees 911 through 913), enabling users to create music content by simply capturing images of the world around them.

Figure 10:
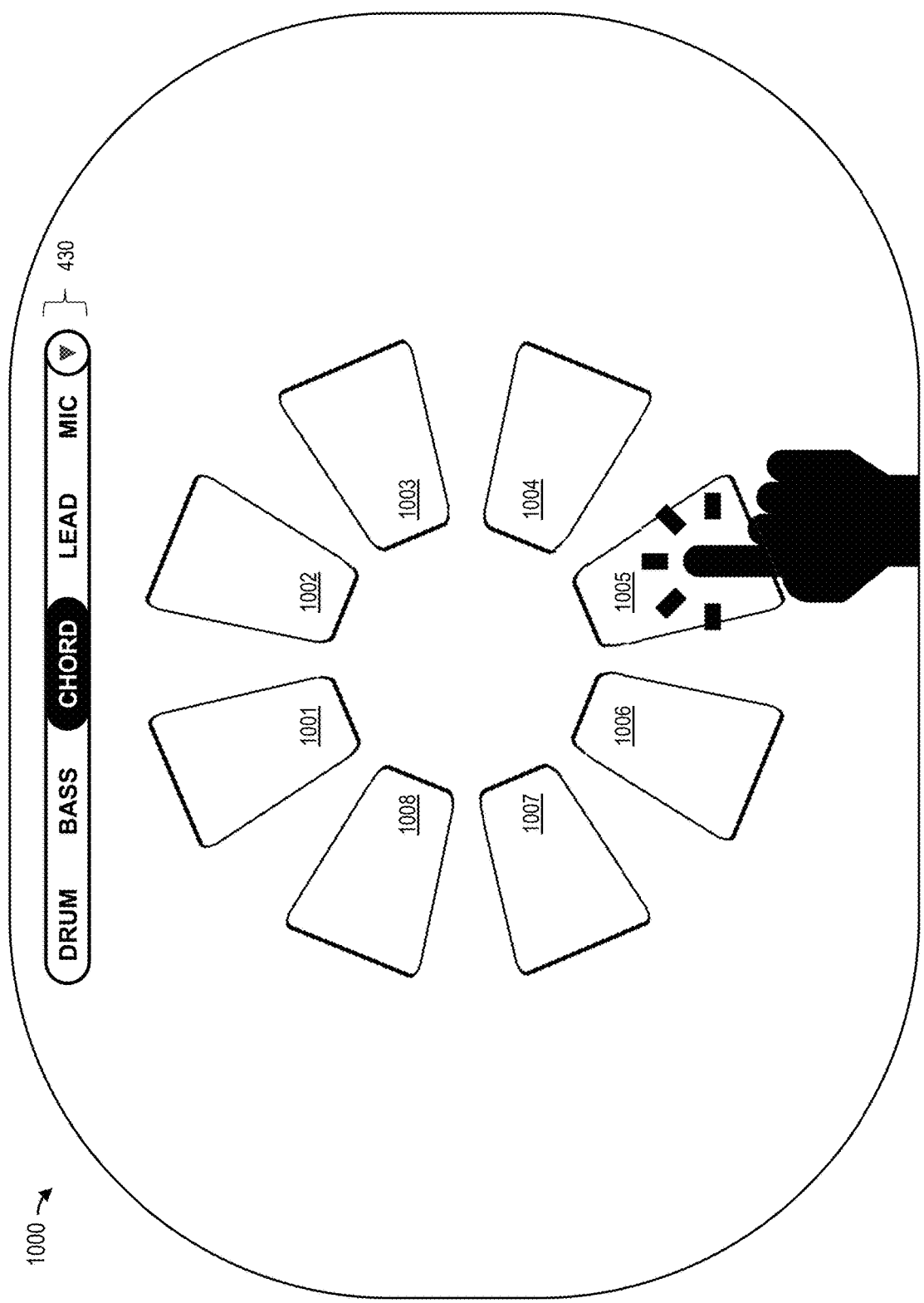
FIG. 10 is a drawing of a view of an augmented reality/virtual reality user interface according to an exemplary embodiment.

FIG. 10 is a view of the AR/VR UI 1000 according to an exemplary embodiment. Similar to the camera-based UI 700, the AR/VR UI 1000 recognizes gestures 315, enables users to interact with virtual objects 330, etc. In the example of FIG. 10, for instance, the AR/VR UI 1000 provides functionality for the user to interact with an array of virtual buttons 1001-1008.

Figure 11:
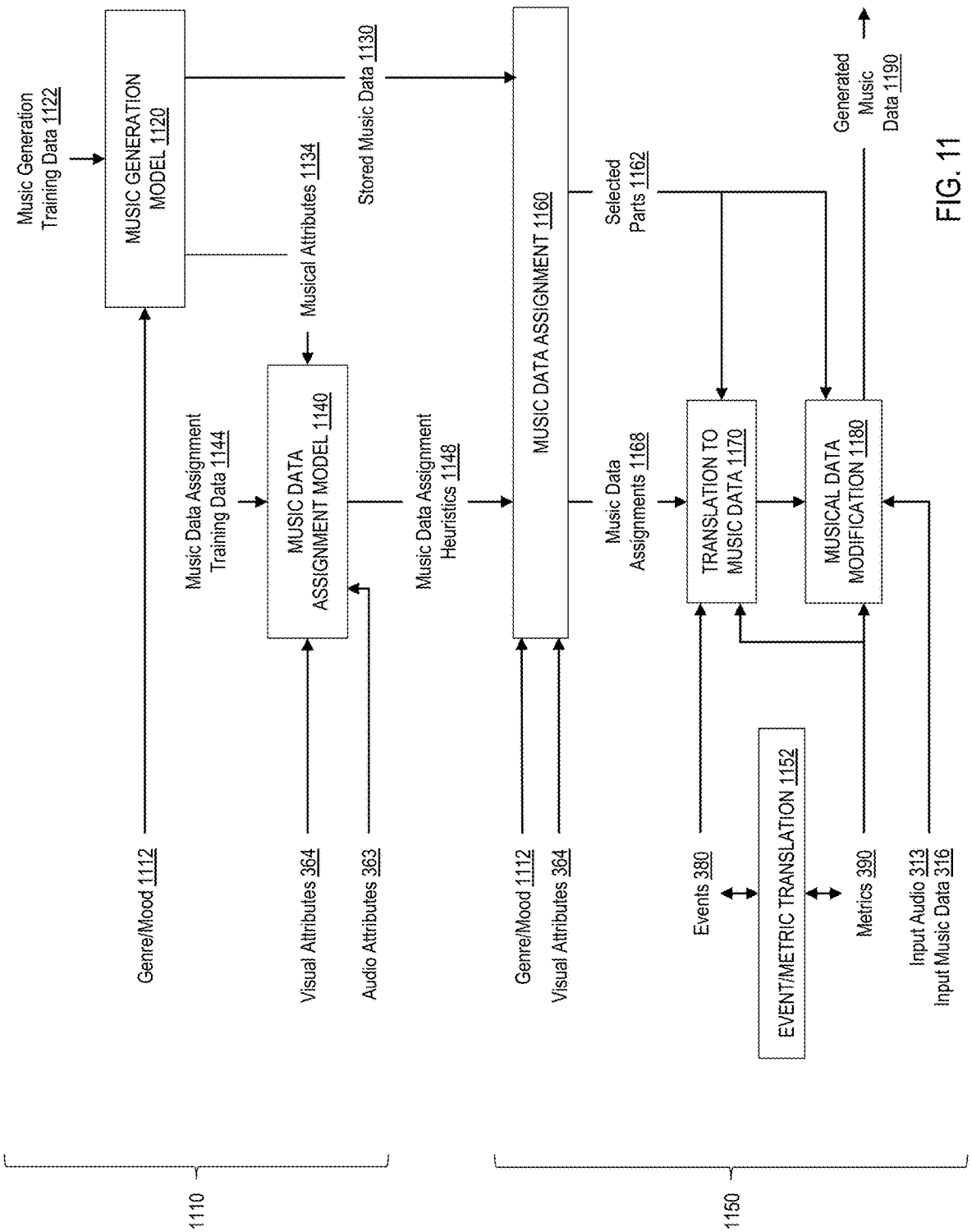
FIG. 11 is a block diagram that includes a music data generation unit and a music data translation unit according to an exemplary embodiment.

FIG. 11 is a block diagram that includes the music data generation unit 1110 and the music data translation unit 1150 according to an exemplary embodiment. In the embodiment of FIG. 11, the music data generation unit 1110 includes a music generation model 1120 and a music data assignment model 1140. The music data translation unit 1150 includes an event/metric translation module 1152, a music data sound assignment module 1160, a translation to music data module 1170, and a musical data modification unit 1180. As described below, the music data generation unit 1110 uses machine learning to generate a library of stored music data 1130. Meanwhile, the music data translation unit 1150 translates the events 380 and metrics 390 identified in the user input data 210 into generated music data 1190 by selecting parts from the stored music data 1130 (e.g., notes, musical phrases, instruments, musical effects, etc.) and assigning those selected parts to those identified events 380 and metrics 390.

To generate the stored music data 1130, the music data generation model 1120 is trained using music generation training data 1122, which may include compositions composed by professional musicians. By extracting information from the music generation training data 1122, the music data generation model 1120 is able to train itself to generate professional-sounding compositions. For example, after each note, the music data generation model 1120 may determine which note is most probable to follow using Markov chains,[1] a recurrent neural network,[2] a convolutional neural network,[3] etc. The music data generation model 1120 may be refined based on the rules of music theory, for example using reinforcement learning.[4] The music data generation model 1120 may be trained on datasets that are coded as belonging to different genres 1112, being evocative of different moods, etc., to generate stored music data 1130 for users with specific user preferences 450.

[1] See, e.g., Ilana Shapiro & Mark Huber, "Markov Chains for Computer Music Generation," Journal of Humanistic Mathematics, Volume 11 Issue 2 (July 2021), pages 167-195. DOI: 10.5642/jhummath.202102.08
[2] See, e.g., Sigurdur Skúli, "How to Generate Music using a LSTM Neural Network in Keras," Towards Data Science, 7 Dec. 2017, https://towardsdatascience.com/how-to-generate-music-using-a-lstm-neural-network-in-keras-68786834d4c5
[3] See, e.g., Isaac Tham, "Generating Music Using Deep Learning," Towards Data Science, 25 Aug. 2021, https://towardsdatascience.com/generating-music-using-deep-learning-cb5843a9d55e
[4] See, e.g., Jaques et al., "Generating Music by Fine-Tuning Recurrent Neural Networks with Reinforcement Learning," Deep Reinforcement Learning Workshop, NIPS (2016), https://static.googleusercontent.com/media/research.google.com/en//pubs/archive/45871.pdf The stored music data 1130 may include notes, musical phrases instruments, musical effects, such as tuning to specific notes (e.g., re-tuning C# to C), tuning to microtonal pitches (e.g., re-tuning to a non-Western musical scale), applying novel modulations to metrics (e.g., applying a low-frequency oscillator or envelope to pitch for the purposes of automatic vibrato), applying response curves to metrics (e.g., applying a Bezier curve to user inputs to "compress" a user's gestural range), quantizing the timing of events and/or metrics to a pre-set grid (e.g., aligning every note to ⅛th note divisions of a tempo), repeating events and metrics (e.g., repeating single events for a delay-like effect), triggering algorithmic sequences of events and metrics (e.g., a single event 380 triggers an entire melodic sequence or arpeggiation), adding additional events 380 and metrics 390 to a performance (e.g., adding a synchronized drum beat to a vocal performance), routing external data to affect musical data (e.g. using weather data as a musical modifier), etc.

Each composition, part, and effect in the stored music data 1130 has its own musical attributes 364 (e.g., the key, scale, tempo, meter, harmony, chord, melody, pattern, rhythm, groove, texture, timbre, dynamics, form, tonality, genre, instrument, etc.), which are used by the system 200 to select stored music data 1130 to modify and/or enhance the user input data 210.

To create audio content that is reflective of the user input data 210 provided by each user, the system 200 selects parts from the stored music data 1130 and assigns each part to each of the events 380 and metrics 390 identified in the user input data 210 based on the visual attributes 364 of the visual input 314 and/or objects 330 or gestures 315 identified in the visual input 314. The visual attributes 364 of the visual input 314 may include, for example, the color palette, saturation, brightness, contrast, dynamic range, sharpness, complexity, etc. The visual attributes 364 of recognized objects 314 or gestures 315 may include size, color profile, movement, etc. For example, darker visual input 314 may be assigned to lower pitched parts, faster moving objects 330 may be assigned to higher tempo instruments, etc.

To enable the system 200 to select and assign parts from the stored music data 1130 based on the visual attributes 364 identified in the user input data 210, the music data assignment model 1140 uses machine learning to generate music data assignment heuristics 1148 for mapping musical attributes 1134 of the stored music data 1130 to visual attributes 364 identified in the user input data 210. To generate those music data assignment heuristics 1148, the music data assignment model 1140 may be trained using music data assignment training data 1144, which may include examples of musical attributes 1134 mapped to visual attributes 364. The music generation training data 1122 and the music data assignment model 1140 may be stored, for example, in the non-transitory computer readable storage media 190.

In some embodiments, the music data assignment model 1140 may also generate heuristics 1148 for selecting and assigning parts from the stored music data 1130 by comparing the musical attributes 1134 of the stored music data 1130 to the audio attributes 363 of the input audio 313 and/or the input music data 316.

The music data translation unit 1150 includes a music data sound assignment module 1160 that selects parts from stored music data 1130 and outputs music data assignments 1168 assigning the selected parts 1162 to the events 380 and metrics 390 identified in the user input data 210. In some embodiments, to select the selected parts 1162 preferred by the user, the system 200 identifies a genre 1112 or mood preferred by the user. In some instances, the genre/mood 1112 may be specified by the user as part of the user preferences 430 specified by the user (e.g., input via the musical UI 320 as shown in FIGS. 4A and 10). In other instances, the genre/mood 1112 preferred by the user may be determined by the system 200, for example by analyzing the music streamed by the user via a music streaming service.

To assign the selected parts 1162 to the events 380 and metrics 390 identified in the user input data 210, the music data assignment module 1160 may use the music data assignment heuristics 1148 described above to compare the musical attributes 1134 of the stored music data 1130 to the visual attributes 364 identified in the visual input 214. For example, the events 380 may be used to dictate the timing of the generated music data 1190 while the metrics 390 may dictate the quality of that generated music data 1190 (e.g., pitch, key, timbre, etc.). For instance, a selected part 1162 that continues after a nearly instantaneous event (such as the strumming of a guitar string) may be assigned to an instantaneous trigger 382 (such as a tap on the touchscreen) while a selected part 1162 that has a defined period of persistence (such as the pressing of a piano key) may be assigned to a gate 384 having a defined period of persistence (such as pressing and holding a button).

For each of the selected parts 1162, the music data assignment module 1160 may use the music data assignment heuristics 1148 to select the events 380 and metrics 390 having visual attributes 364 that are most closely associated with the musical attributes 1134 of each selected part 1162. Using the example of FIGS. 5A and 5B, for instance, if the selected parts 1162 are a trio of a piano, a horn, and drums, the music data assignment module 1160 may assign the piano part 1162 to events 380 and metrics 390 involving the books 510, assign the horn part 1162 to events 380 and metrics 390 involving the bottles 541-543, and assign the drums part 1162 to events 380 and metrics 390 involving the couch cushions 531 through 534.

Additionally, in some embodiments, the music data assignment module 1160 may use the music data assignment heuristics 1148 to select the events 380 and metrics 390 having audio attributes 363 that are most closely associated with the musical attributes 1134 of the selected parts 1162.

The music data assignment unit 1160 outputs the selected parts 1162 and the music data assignments 1168 to the translation to music data module 1170 and the musical data modification unit 1180. The translation to music data module 1170 translates the events 380 and metrics 390 identified in the input data 210 to music data (e.g., a MIDI file) that includes the notes and musical phrases specified in the music data assignments 1168. The musical data modification unit 1180 modifies the music data output by the translation to the music data module 1170 (as well as any input audio 313 and input music data 316) based on the metrics 390 and/or the events 380. As described above, for instance, the musical data modification unit 1180 may tune the music data to specific notes or microtonal pitches, apply novel modulations or response curves to metrics 390, etc. In some embodiments, the music data translation unit 1150 may also include an event/metric translation unit 1152 that translates events 380 to metrics 390 and translates metrics 390 to events 380. The music data translation unit 1150 outputs the generated music data 1190 to the audio engine 1210 and the video engine 1250.

Figure 12:
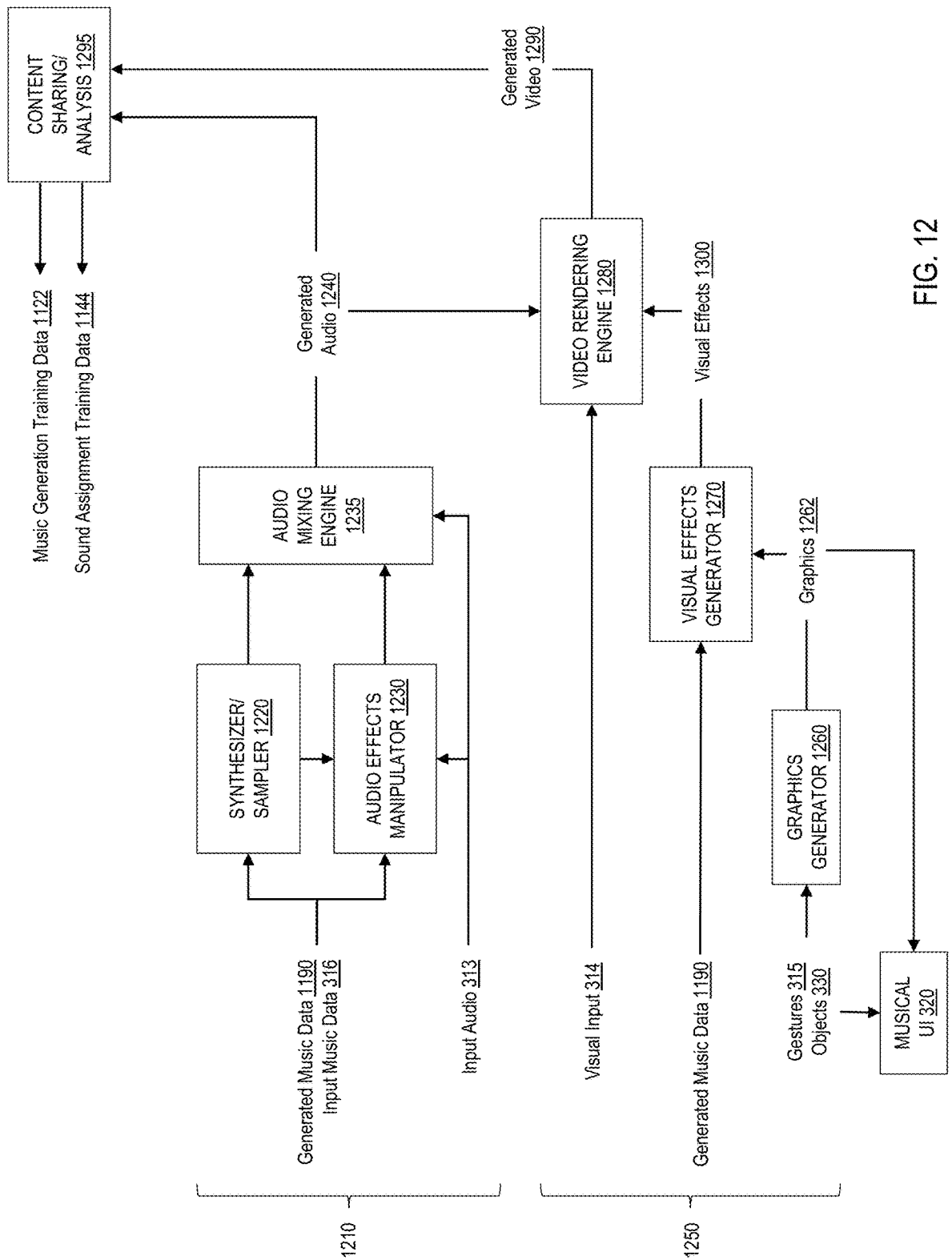
FIG. 12 is a block diagram that includes an audio engine and a video engine according to an exemplary embodiment.

FIG. 12 is a block diagram that includes the audio engine 1210 and the video engine 1250 according to an exemplary embodiment. In the embodiment of FIG. 12, the audio engine 1210 includes a synthesizer/sampler 1220, an audio effects manipulator 1230, and an audio mixing engine 1245.

The synthesizer/sampler 1220 converts the generated music data 1190 to audio that can be output to the user (e.g., via the speaker 137) or encoded in video by the video engine 1250. Additionally, the synthesizer/sampler 1220 converts any input music data 316 (provided, for example, via a peripheral musical instrument 140) to audio. The audio effects manipulator 1230 manipulates the audio output by the synthesizer/sampler 1220 (as well as any input audio 313 provided by the user) as specified by the generated music data 1190. As described above, for instance, the audio effects manipulator 1230 may tune the audio to specific notes or microtonal pitches, apply novel modulations or response curves, etc. The audio mixing engine 1235 mixes the audio output by the synthesizer/sampler 1220, the audio effects manipulator 1230, and/or any input audio 313 provided by the user and outputs generated audio 1240, which can be output to the user as sound (e.g., via the speaker 137) or output as an audio file (e.g., published via a music streaming service, shared via social media, etc.).

In the embodiment of FIG. 12, the video engine 1250 includes a graphics generator 1260, a visual effects generator 1270, and a video rendering engine 1280. The graphics generator 1260 generates graphics 1262 representing the objects 330 and/or gestures 315 identified in the visual input 314. As described above, those graphics 1262 may be output to the user via the musical UI 320. In some instances, those graphics 1262 are only output to the user. In other instances, those graphics 1262 are passed to the visual effects generator 1270 so they can be included in the multimedia content generated by the system 200.

The visual effects generator 1270 uses the generated music data 1190 to generate visual effects 1300. Just as the music data assignment heuristics 1148 match the musical attributes 1134 of selected parts 1192 to the visual attributes 364 of objects 330 and other events 380 and metrics 390, the visual effects generator 1270 stores and applies rules (e.g., if-then statements, look-up tables, formulas, etc.) to translate generated music data 1190 having musical attributes 1134 to visual effects 1300 having visual attributes 364. For example, the visual effects generator 1270 may translate specific notes in the generated music data 1190 to visual effects 1300 of specific colors, apply a warping effect when the generated music data 1190 has a threshold level of vibrato, etc. Because that generated music data 1190 was derived from events 380 and metrics 390 in the visual input 314, the visual effects 1300 generated by the visual effects generator 1270 are synchronized with the events 380 and correspond to the metrics 390 that were used to generate that generated music data 1190. Accordingly, the visual effects 1300 can visually demonstrate for the viewer the source of the sound.

Figure 13:
FIG. 13 are views illustrating example visual effects according to an exemplary embodiment.

FIG. 13 are views illustrating example visual effects 1300 according to an exemplary embodiment.

As described above, in some embodiments, the system 200 generates audio content by identifying events 380 and metrics 390 in the visual input 314, which are then translated into generated music data 1190. In the example of FIG. 13, the events 380 and metrics 390 are identified by recognizing objects 330 in the visual input 314, specifically a balloon 901 and trees 911 through 913. As described above, the system 200 may select music data by assigning stored music data 1130 to the events and metrics 390 in the visual input 314 based on the visual attributes 364 of those events and metrics 390. In the example of FIG. 13, for instance, the system 200 assigns a part from the stored music data 1130 (e.g., notes, musical phrases, instruments, etc.) to the balloon 801 and a part to the trees 911-913 by using the music data assignment heuristics 1148 to match the musical attributes 1134 of each part to the visual attributes 364 of the balloon 801 (e.g., size, color profile, motion, type of movement, etc.) and the visual attributes 364 of the trees 911-913 (e.g., size, color, pattern, spacing, etc.).

The system 200 then generates audio content that is synchronized with the events 380 performed by those objects 330 and corresponds to the metrics 390 derived from those objects 330. Additionally, the graphics generator 1260 and the visual effects generator 1270 (described above with reference to FIG. 12) generate graphics 1262 representing identified objects 330 and visual effects 1500 that are synchronized with and correspond to the generated music data 1190. In the example of FIG. 13, for instance, the visual effects 1500 may first animate the balloon 901 to indicate that the balloon is the source of the audio content being output at that time. Next, the trees 911-913 may be the source of a chord followed by the trees 912 and 913.

Because the visual effects 1300 are generated using generated music data 1190 that was derived from the events 380 and metrics 390 in the user input data 210, the visual effects 1300 generated by the visual effects generator 1270 are synchronized with the events 380 and correspond to the metrics 390 in the user input data 210. Accordingly, the visual effects 1300 can visually demonstrate for the viewer the source of the sound.

Referring back to FIG. 12, the video rendering engine 1280 applies those visual effects 1300 to the visual input 314 and renders generated video 1290 that includes the generated audio 1240 output by the audio engine 1210.

The content sharing and analysis module 1295 provides functionality for users to output and share the generated audio 1240 and/or generated video 1290 (e.g., by publishing the generated audio 1240 via a music streaming service, publishing the generated video 1290 via an online video platform, sharing the generated audio 1240 and the generated video 1290 via social media, etc.). In some embodiments, the content sharing and analysis module 1295 may also provide functionality for users to output and share the generated music data 1190. The content sharing and analysis module 1295 may also analyze the content generated and shared by users, as well as the popularity of that shared content, to update the music generation training data 1122 and the sound assignment training data 1144. Accordingly, the music generation model 1120 and/or the music data assignment model 1140 (described above with reference to FIG. 11) can learn which stored music data 1130 and music data assignments 1168 are preferred by content creators and more popular with audiences and use that information to when generating and assigning music data for future users.

While the most comprehensive embodiment of the multimedia content generation system 200 has been described above, it is important to note that none of the features described above are critical. Instead, in various embodiments, the multimedia content generation system 200 may include some—but not all—of the features described above. For example, in some embodiments, the musical UI 320 may not include all of the user interfaces described above. In fact, some embodiments of the system 200 may not include a musical UI 320 and may instead receive user input data 210 that includes only upload data 218. In some embodiments, the event/metric detection 340 may only include one of the touch detection module 342, the visual analysis unit 350, the audio analysis module 343, and the IMU-based gestural interpretation module 367. In some embodiments, the event/metric detection 340 may detect—and the music data translation unit 1150 may translate—events 380 or metrics 390. Some embodiments may use a library of stored music data 1130 without generating that stored music data 1130 using the music generation model 1120. Similarly, some embodiments may use music data assignments heuristics 1148 without generating those music data assignments heuristics 1148. Additionally, some embodiments may use stored music data 1130 and/or music data assignments heuristics 1148 (e.g., that include if-then statements, look-up tables, formulas, etc.) that have not been generated using machine learning. In some embodiments, the audio engine 1210 may include either the synthesizer/sampler 1220 or the audio effects manipulator 1230. In instances where the audio engine 1210 includes only one of the synthesizer/sampler 1220 or the audio effects manipulator 1230, the audio engine 1210 may not include the audio mixing engine 1235. In some embodiments, the video engine 1250 may not include the graphics generator 1260. In some embodiments, the content sharing and analysis unit 1295 may only provide functionality to output and/or share generated video 1290 or generated audio 1240 or generated music data 1190. In some embodiments, the content generated and shared by users may not necessarily be used to update training data used to generate future content. Therefore, while the a preferred embodiment of the multimedia content generation system 200 has been described above, those skilled in the art who have reviewed the present disclosure will readily appreciate that other embodiments can be realized within the scope of the invention. Accordingly, the present invention should be construed as limited only by any appended claims.

What is claimed is:

1. A computer-implemented method for creating music using visual input, the method comprising:
   storing a library of stored music data, the stored music data comprising a plurality of parts, each part comprising musical notes;
   receiving, from a user, user input data that includes visual input;
   detecting, in the user input data, events and metrics; and
   generating audio that is synchronized with the detected events and corresponds to the detected metrics by:
   selecting, from the library of stored music data, parts of the stored music data;
   generating music data by assigning each of the selected parts of the stored music data to the detected events and metrics; and
   translating the events and metrics detected in the user input data to audio by synthesizing the musical notes of the assigned parts of the generated music data;
   generating visual effects that are synchronized with the events detected in the user input data and correspond to the metrics detected in the user input data by:
   storing rules for translating the stored music data to visual effects; and
   using the stored rules to translate the assigned parts to visual effects; and
   generating video that includes the visual input, the generated audio, and the generated visual effects.

2. The method of claim 1, wherein detecting events and metrics in the user input data comprises detecting objects or gestures in the visual input.

3. The method of claim 2, wherein assigning each of the selected parts of the stored music data to each of the detected events and metrics comprises:
   storing music data assignment heuristics that associate musical characteristics with visual characteristics;
   identifying musical characteristics of each selected part of the stored music data;
   identifying visual characteristics of each detected object or gesture;
   using the music data assignment heuristics to assign each selected part to a detected object or gesture based on the musical characteristics of the selected part and the visual characteristics of the detected object or gesture.

4. The method of claim 3, wherein storing the music data assignment heuristics comprises:
   storing music data assignment training data that includes examples of musical attributes associated with visual attributes;
   using a machine learning model, trained on the music data assignment training data, to generate the music data assignment heuristics.

5. The method of claim 2, wherein detecting the events and metrics in the user input data further comprises:
   generating virtual objects corresponding to the detected objects or gestures;
   outputting those virtual objects to the user via a user interface;
   detecting user interaction with the virtual objects via the user interface.

6. The method of claim 1, wherein the library of stored music data includes notes, musical phrases, or musical effects.

7. The method of claim 6, wherein synthesizing the generated music data comprises:
   applying musical effects selected from the library of stored music data to parts selected from the library of stored music data; or
   applying musical effects selected from the library of stored music data to input audio or input music data included in the user input data.

8. The method of claim 1, wherein the user input data further includes touch input received via a touchpad.

9. The method of claim 1, wherein the user input data further includes audio or music data.

10. The method of claim 1, wherein storing the library of stored music data comprises:
    storing music generation training data that includes compositions;
    using a machine learning model, trained on the music data assignment training data, to generate the stored music data.

11. A system for creating music using visual input, comprising:
- non-transitory computer readable storage media that stores a library of stored music data, the stored music data comprising a plurality of parts, each part comprising musical notes;
- an event/metric detection unit that:
  - receives user input data, from a user, that includes visual input; and
  - detects events and metrics in the user input data;
- a music data translation unit that translates the events and metrics detected in the user input data to generated music data by:
  - selecting parts of the stored music data; and
  - assigning each of the selected parts to the detected events and metrics;
- an audio engine that generates audio that is synchronized with the detected events and corresponds to the detected metrics by synthesizing the musical notes of the assigned parts of the generated music data; and
- a video engine that:
  - generates visual effects that are synchronized with the events detected in the user input data and correspond to the metrics detected in the user input data by applying rules to translate the generated music data to visual effects; and
  - generates video includes the generated audio, the visual input, and the generated visual effects.

12. The system of claim 11, wherein the event/metric detection unit detects the events and metrics in the user input data by detecting objects or gestures in the visual input.

13. The system of claim 12, wherein the music data translation unit assigns each of the selected parts of the stored music data to each of the detected events and metrics by:
- identifying musical characteristics of each selected part of the stored music data;
- identifying visual characteristics of each detected object or gesture;
- using music data assignment heuristics, which associate musical characteristics with visual characteristics, to assign each selected part to a detected object or gesture based on the musical characteristics of the selected part and the visual characteristics of the detected object or gesture.

14. The system of claim 13, further comprising:
- a music data association model that uses a machine learning model, trained on music data assignment training data that includes examples of musical attributes associated with visual attributes, to generate the music data assignment heuristics.

15. The system of claim 12, wherein the event/metric detection unit further detects the events and metrics in the user input data by:
- generating virtual objects corresponding to the detected objects or gestures;
- outputting those virtual objects to the user via a user interface;
- detecting user interaction with the virtual objects via the user interface.

16. The system of claim 11, wherein the library of stored music data includes notes, musical phrases, or musical effects.

17. The system of claim 16, wherein the audio engine synthesizes the generated music data by:
- applying musical effects selected from the library of stored music data to parts selected from the library of stored music data; or
- applying musical effects selected from the library of stored music data to input audio or input music data included in the user input data.

18. The system of claim 11, wherein the user input data includes touch input received via a touchpad.

19. The system of claim 11, wherein the user input data further includes audio or music data.

20. The system of claim 11, further comprising:
- a music generation model that uses a machine learning model, trained on music generation training data that includes compositions, to generate the stored music data.

* * * * *